United States Patent [19]
Palmer

[11] Patent Number: 5,220,940
[45] Date of Patent: Jun. 22, 1993

[54] FLOW CONTROL VALVE WITH VENTURI

[76] Inventor: David Palmer, 200 Berkeley Rd., North Andover, Mass. 02174

[21] Appl. No.: 851,016

[22] Filed: Mar. 13, 1992

Related U.S. Application Data

[63] Continuation-in-part of Ser. No. 669,746, Mar. 15, 1991, abandoned, which is a continuation-in-part of Ser. No. 405,835, Sep. 11, 1989, Pat. No. 5,000,221, which is a continuation-in-part of Ser. No. 178,505, Apr. 7, 1988, abandoned.

[51] Int. Cl.[5] ............................................. G05D 16/10
[52] U.S. Cl. ................................. 137/487.5; 137/500; 137/613
[58] Field of Search .............. 137/500, 501, 502, 503, 137/487.5, 505.38, 613

[56] References Cited

U.S. PATENT DOCUMENTS

| | | | |
|---|---|---|---|
| 2,918,933 | 12/1959 | Boitnott | 137/502 |
| 3,138,174 | 6/1964 | Gilpin | 137/503 X |
| 3,237,616 | 3/1966 | Daigh et al. | 251/5 X |
| 3,605,788 | 9/1971 | Brown | 137/502 X |
| 3,978,883 | 9/1976 | Petersen | 137/500 X |
| 4,431,020 | 2/1984 | Kowalski | 137/487.5 X |

*Primary Examiner*—Stephen M. Hepperle
*Attorney, Agent, or Firm*—Bromberg & Sunstein

[57] ABSTRACT

To measure and control the flow of fluid through a passageway, a venturi meter and a regulator are disposed in the passageway. The area of the cross-section gradually decreases and then gradually increases. The venturi meter also has first and second static pressure ports, the first port being located at a relatively wide portion of the venturi meter, and the second port being located at a narrower portion of the venturi meter. Each of the ports is disposed about the circumference of the venturi. A regulator, or another type of adjustable valve variably impedes flow through the passageway. A controller measures the static pressure at first and second ports and adjusts the regulator or valve based on the static pressure measured at the first and second static pressure ports.

Another device for controlling flow through a passageway comprises a piston having one face exposed to the fluid in the path and forming part of a venturi disposed in the passageway such that the conduit has a cross-sectional area that decreases and then increases. An actuator adjusts the position of the piston based on the static pressure measured at first and second static pressure ports.

17 Claims, 6 Drawing Sheets

FLOW CONTROL VALVE WITH VENTURI

This application is a continuation-in-part of application Ser. No. 07/669,746 (the "parent application"), filed Mar. 15, 1991, now abandoned which is a continuation-in-part of application Ser. No. 07/405,835 (the "Grandparent application"), filed Sept. 11, 1989 and issued Mar. 19, 1991 as U.S. Pat. No. 5,000,221, which is a continuation-in-part of application Ser. No. 07/178,505, filed Apr. 7, 1988, now abandoned. Filed concurrently herewith are applications for Flow Regulator Adaptable For Use With Exhaust From A Process-Chamber, Process-Chamber Flow Control System and Flow Regulator Adaptable For Use With Process-Chamber Air Filter by the same inventor as the present invention. All these inventions are hereby incorporated herein by reference.

TECHNICAL FIELD

This invention generally relates to a device for regulating the flow of a fluid, in particular a gas, through the device.

BACKGROUND ART

FIG. 1 shows a commercially available prior art system for controlling flow. It uses a venturi meter 10, which has a input 81 and a throat 89 that is narrower than the input. The venturi meter 10 has a circular cross-section and is formed by inserting into a length of pipe, a short pipe that has an outer diameter equal to the inner diameter of the longer pipe. After the short pipe is inserted into the longer pipe, a hole is drilled through both pipes to provide a pressure conduction port 22 at the throat 89. At a point upstream of the this pressure conduction port 22, another hole is drilled only through the longer pipe to provide another pressure conduction port 21. Downstream of the venturi meter 10 is located a butterfly valve 19, which is controlled by a stepper motor. A microprocessor controls the motor so as to vary the amount the butterfly valve 19 impedes the flow based on the pressure differential between the two ports 21 and 22.

DISCLOSURE OF INVENTION

The present invention controls flow through a conduit using a venturi meter disposed in the conduit. The venturi meter preferably has a generally circular cross-section in the plane that is perpendicular to fluid flow, wherein the area of the cross-section gradually decreases and then gradually increases. The venturi meter also having first and second static pressure ports, the first port being located at a relatively wide portion of the venturi meter, and the second port being located at a narrower portion of the venturi meter. Preferably, each of the ports are disposed about the circumference of the venturi. A pressure transducer determines the pressure at each of these ports or the difference in pressure between these two ports. The invention also includes a valve that is adjusted based on the static pressure measured at the first and second static pressure ports.

In a preferred embodiment, a piston is mounted just downstream of the adjustable valve. The piston has two faces, frontal and distal. The frontal face is exposed to fluid flowing through the conduit. The distal face is exposed to a reference pressure. Several forces act on the piston: the fluid pressures on the frontal and distal faces and a restoring force. These forces affect the position of the piston. The piston is mounted so as to variably restrict flow through the conduit, and the amount that the piston restricts flow depends on the position of the piston. The restoring force, which in a preferred embodiment includes the weight of the piston, tends to lessen the amount the piston restricts flow through the conduit. Preferably, the adjustable valve is shaped so as to redirect flow so that fluid flows across the frontal face of the piston away from the central area radially outward towards the perimeter.

In an alternative flow control valve, a piston forms part of a venturi. The piston is movably mounted so that the piston may move in a direction transverse to the flow so as to narrow or widen the venturi. First and second static pressure ports are respectively located at a relatively wide a relatively narrow portion of the venturi. A pressure transducer determines the pressure at these two ports or the difference in pressure between these two ports. Another transducer determines the position of the piston, and an actuator adjusts the position of the piston. A controller receives from the transducers information regarding the position of the piston and the static pressure at the two ports and controls the actuator

DESCRIPTION OF SPECIFIC EMBODIMENTS

Figure 1:
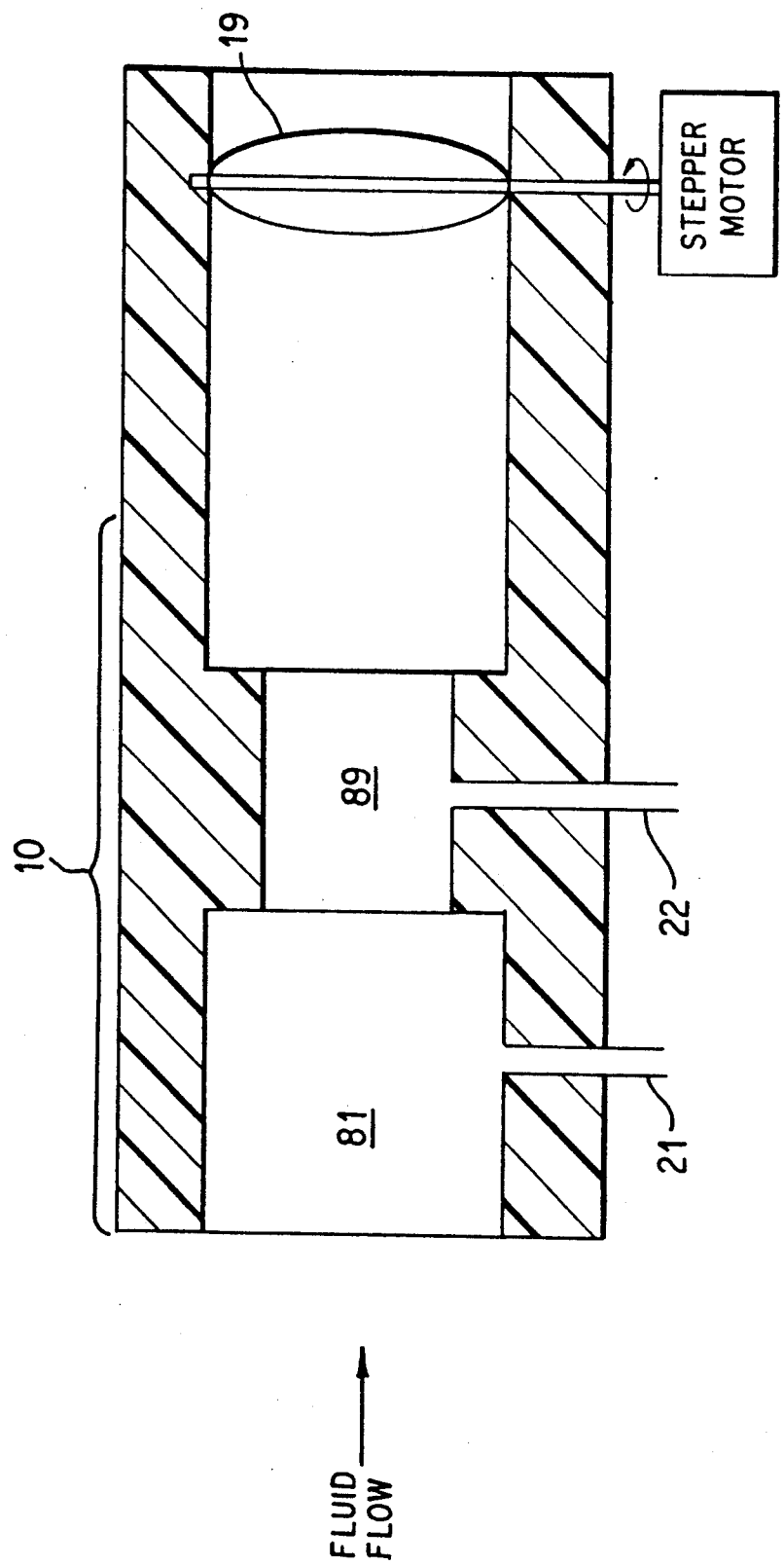
FIG. 1 shows a prior art device for measuring and controlling the flow of fluid through a conduit.
Figure 2:
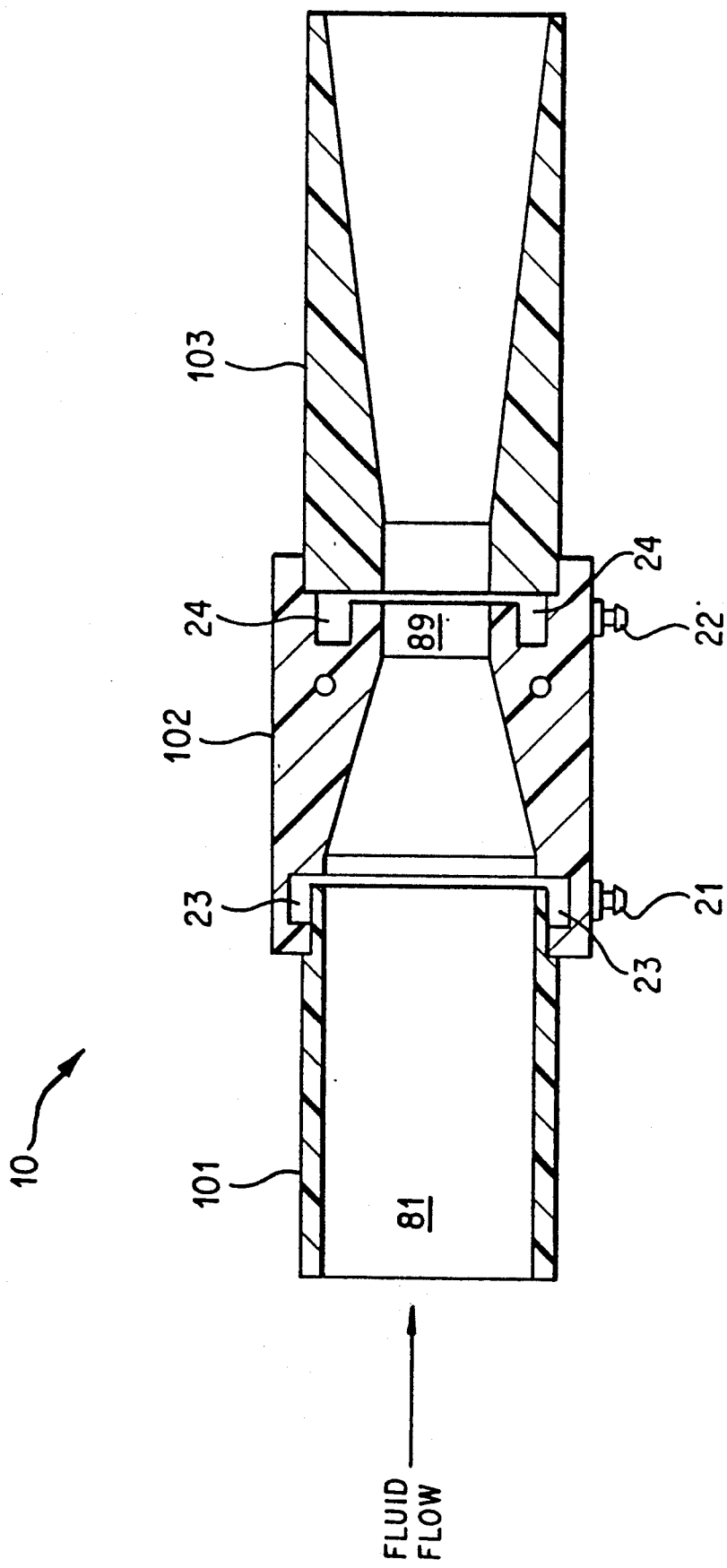
FIG. 2 shows a venturi meter used in the present invention.

FIG. 2 shows a venturi meter 10 used in a preferred embodiment of the present invention. The cross-section of the conduit through this venturi meter 10 is circular. Unlike the prior art system shown in FIG. 1, this venturi meter 10 gradually narrows to the throat 89 and then gradually expands. The static pressure ports 21 and 22 extend all about the circumference of the conduit by means of annular chambers 23 and 24 respectively. Because all around the circumference of the conduit these chambers 23 and 24 are exposed to the flow through the conduit, the static pressure measured at ports 21 and 22 is an average of the static pressure all around the conduit's circumference. By taking the average static pressure around the conduit's circumference, the venturi meter 10 determines the flow rate more accurately than the meter shown in FIG. 1, especially when, because of a bend in the conduit upstream of the venturi meter 10, for example, the velocity of the fluid varies from one side of the conduit to the other.

Figure 3:
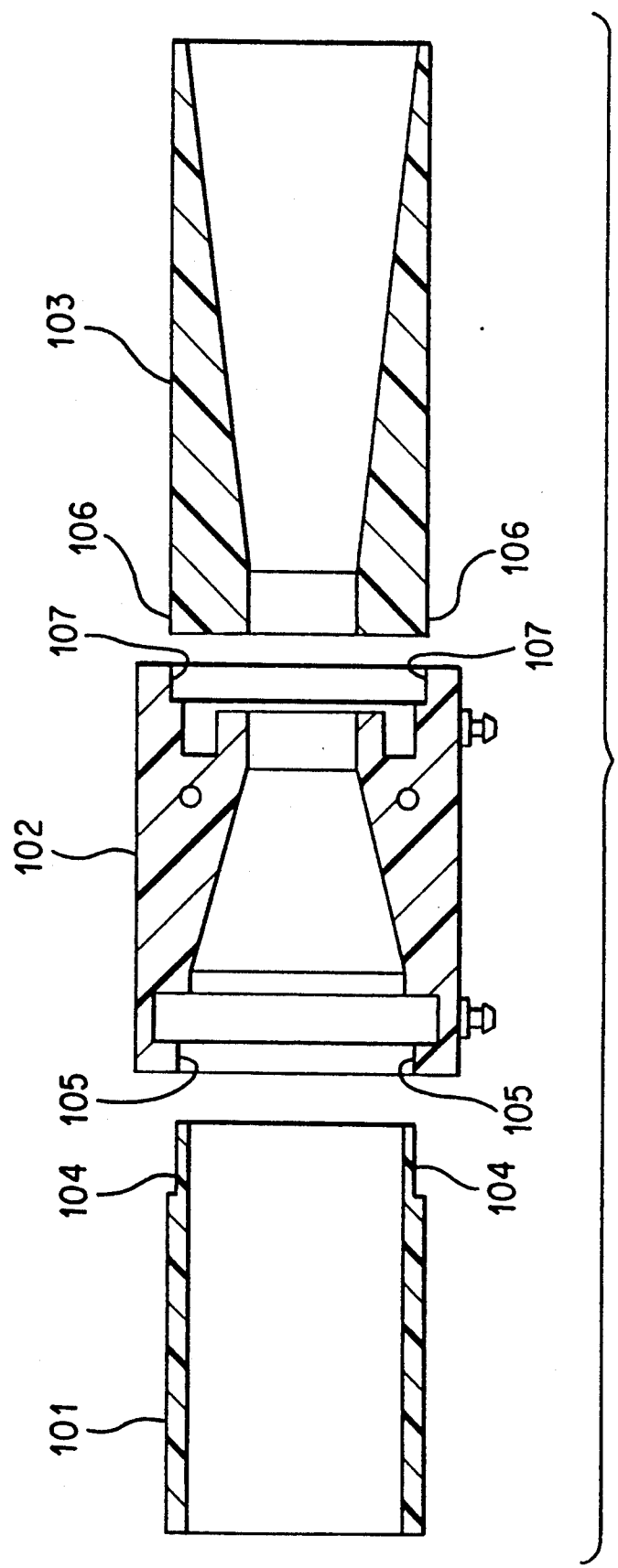
FIG. 3 shows how the venturi meter shown in FIG. 2 may be assembled from three major components.

The venturi meter 10 shown in FIG. 2 can be made of three major components, 101, 102 and 103. FIG. 3 shows the FIG. 2 venturi meter 10 disassembled. Component 102 defines the input to the venturi meter and, along with component 102, forms an annular chamber 23. Component 102 defines the narrowing portion of the venturi and part of the throat 89. Components 102 and 103 together define the second annular chamber 24.

Component 103 defines part of the throat 89 and the widening portion of the venturi. These three components, 101, 102 and 103, are preferably made of polyvinyl chloride (PVC) and attached to each other with PVC cement. The cement is placed on surface 104 in order to bond that surface to surface 105, thereby connecting components 101 and 102. Cement is also placed on surface 106 in order to bond that surface to surface 107, thereby connecting components 102 and 103.

Figure 4:
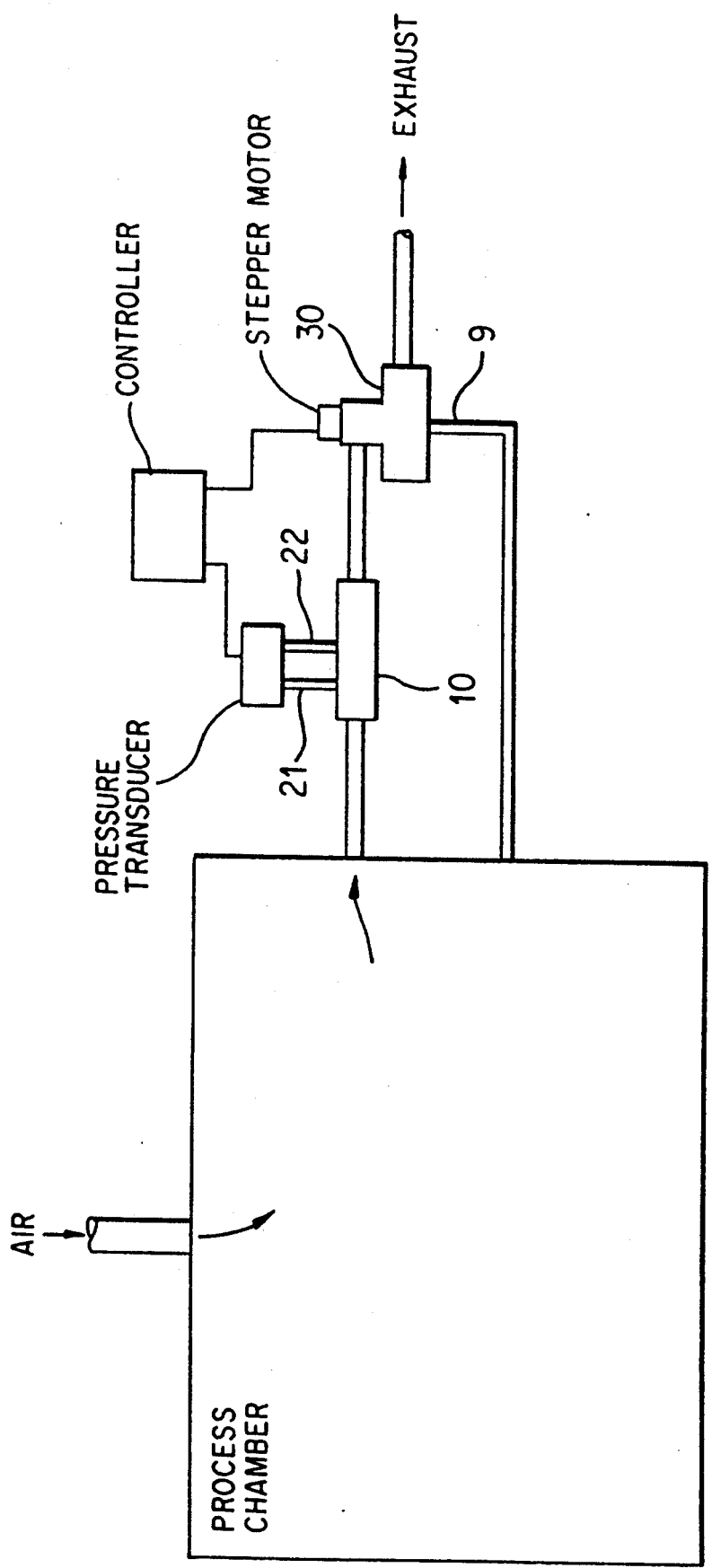
FIG. 4 shows how the invention may be used in an exhaust conduit from a process chamber.

FIG. 4 shows how this venturi meter 10 may be used to control flow from a process chamber, such as a clean room or biotechnology laboratory. Ports 21 and 22 are connected to a pressure transducer (preferably, a Beswick Engineering MH-1008-2 E.N.P.), which in turn is connected to a microprocessor controller. The controller determines the flow rate of fluid through the venturi meter 10 from the difference in pressure between the two ports 21 and 22. The controller causes an increased impedance to the flow in order to decrease the flow rate and causes a decreased impedance in order to increase the flow rate. A regulator 30, such as that shown in FIG. 6 (which is identical to FIG. 6 of the Grandparent application, which has issued as U.S. Pat. No. 5,000,221), may be placed in the conduit upstream or downstream of the venturi meter 10. The modulator 50 in the regulator 30 may be moved up and down by a stepper motor actuated by the controller. The higher the modulator 50 moves the more it impedes the flow through the regulator.

Figure 6:
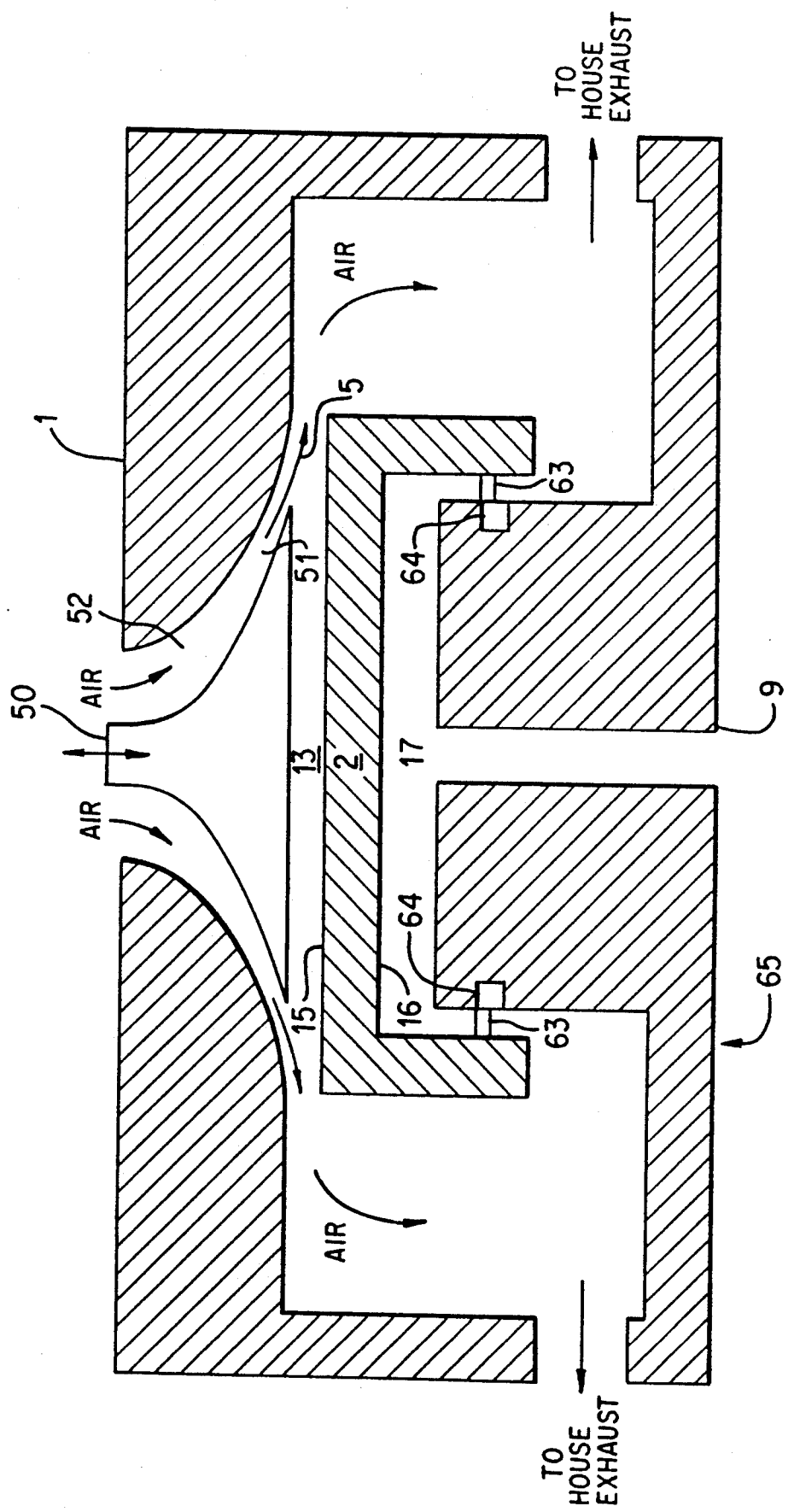
FIG. 6 shows a regulator that may be used with the venturi meter shown in FIG. 2.

FIG. 6 shows a device that regulates the mass flow rate of fluid flowing through the device. Like the devices described above, this device has a piston 2 with a frontal face 15 exposed to a plenum 13 and a distal face 16 exposed to a chamber 17. The chamber 17 has a reference pressure, which is preferably the ambient pressure. The device also has an environment port 4 for connecting the device to the work environment, and an evacuation port 5, through which the fluid flows to the house exhaust and which is constricted by the piston 2 as the piston moves up. This device uses a modulator 50 which directs the fluid flowing from the environment port 4 to the evacuation port 5, such that the fluid flows transversely across the frontal face 15 of the piston 2. The modulator 50 and the manifold 1 form an annular channel 52, which directs the fluid flowing vertically downward so that the fluid flows outwardly and substantially horizontally. This channel 56 is a preferably curved as shown in FIG. 6. It is also preferred that the channel taper to a narrow opening 51; otherwise the expanding annular channel would cause the fluid to lose its velocity. By tapering the channel 52 the velocity of the fluid is preserved. As the fluid flows out of the channel 52 and across the edge of the piston, the Bernoulli effect causes the pressure in the plenum 13 to drop, thereby lifting the piston 2. If the velocity of the fluid increases, the pressure in the plenum 13 will drop further, causing the piston to rise further, and in turn further constricting the evacuation port 5. By constricting the evacuation port 5 the flow of the fluid is retarded. If the velocity of the fluid through the device decreases the pressure in the plenum 13 should thereby increase causing the piston to drop, and in turn causing the evacuation port to open. Thus, the mass flow rate of the fluid through the system can be kept fairly constant by the device.

The desired flow rate through the device can be altered by moving the modulator up and down. Moving the modulator up and down affects the size of the annular channel 52. The device shown in FIG. 6A of the Grandparent application, U.S. Pat. No. 5,000,221, may be used in place of the FIG. 6 device.

The venturi meter 10 shown in FIG. 2 can also be used with a butterfly valve, like the one in the system shown in FIG. 1, instead of the regulator 30 shown in FIG. 6. This configuration requires a controller that has faster response time, since such a configuration lacks a regulator that evens out fluctuations in the flow rate, such as the FIG. 6 regulator, and therefore requires the controller to recognize and even out all the fluctuations. However, for some applications, a system using the FIG. 2 venturi meter and a butterfly valve is adequate. Controlling flow into a process chamber so as to maintain a certain pressure in the process chamber—for instance, a pressure that is a certain amount above or below ambient pressure—is such an application. Because of the size of the process chamber, minor fluctuations in the flow rate have a negligible effect on the pressure in the process chamber. The controller receives information regarding the process chamber pressure and the ambient pressure. If the process chamber pressure begins to drop below the desired level, the flow rate is increased by the controller. The controller decreases the flow rate if the process chamber pressure begins to increase beyond the desired pressure.

Figure 5:
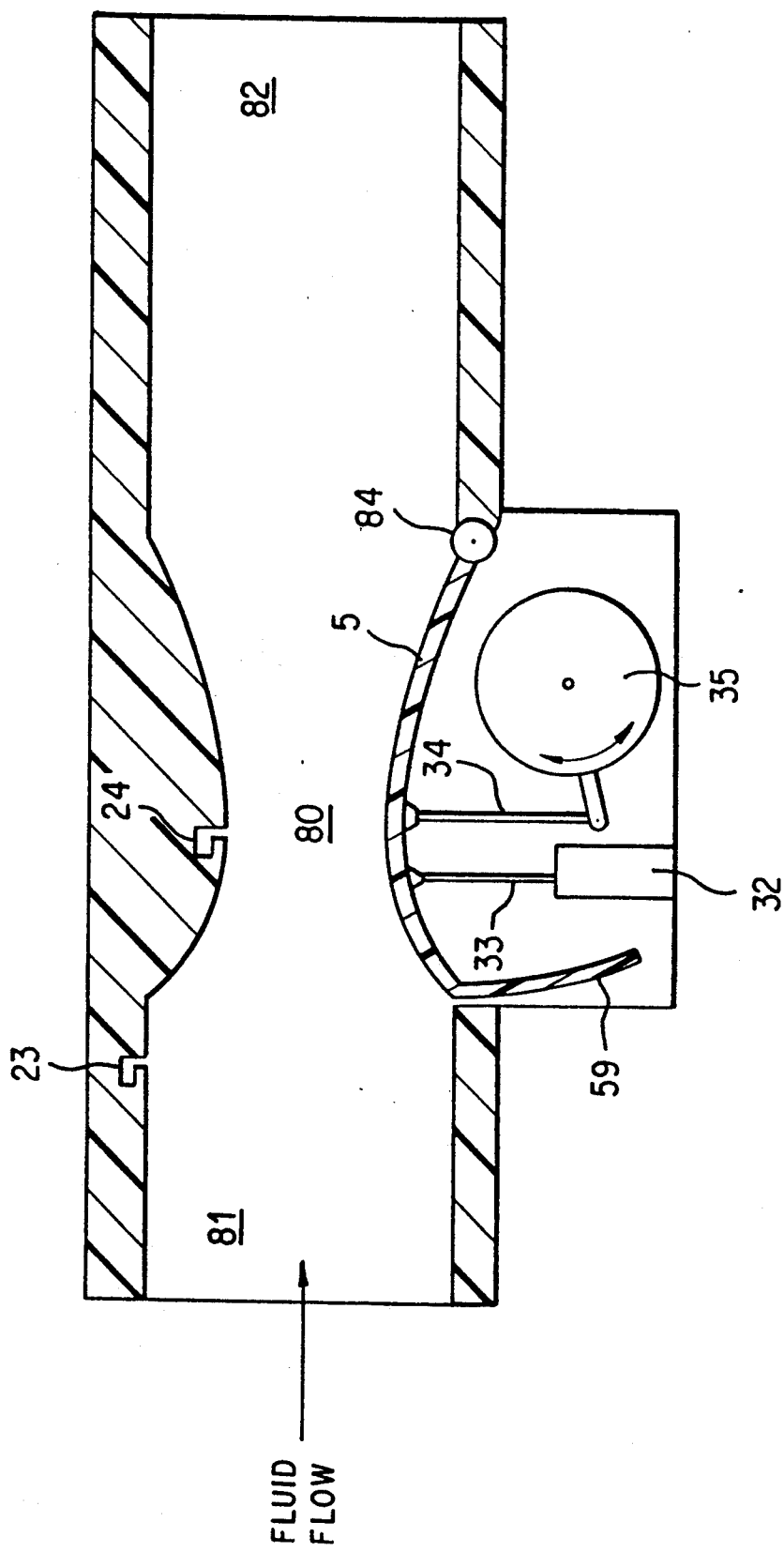
FIG. 5 shows a venturi meter having a cross-sectional area that is varied by a controller.

FIG. 5 shows another device for controlling the flow rate. This device has a rectangular cross-section, the area of which decreases as the flow passes from the input 81 to the throat 80 of the venturi, and then increases again as the flow heads towards the output 82. The throat, or constriction point, 80 may narrowed or widened by movement of the piston 6, which forms the lower surface of the venturi. The piston 5 is hingedly mounted at pivot point 84 and is moved up and down by a stepper motor 35, which is connected to the piston 5 by means of rod 34. The position of the piston may be determined by means of a linear variable displacement transducer 32, which is connected to the piston 5 by means of another rod 33. As the piston 5 is moved up, and the throat 80 constricted, the shape of the venturi changes. A skirt 59 is attached to the forward edge of the piston 5 in order to prevent fluid from flowing under the piston 5. A first static pressure port 23 is located at a wide portion of the conduit, and a second static pressure port 24 is located at a narrower portion of the conduit, preferably the throat of the venturi. (Since the ports 23 and 24 in this device do not extend around the perimeter of the conduit, they do not include annular chambers, such as those in the FIG. 2 device described above.) The pressures measured at these two ports, 23 and 24, are sent to a microprocessor controller, which also receives information from the displacement transducer 32 regarding the position of the piston 5. The controller causes the stepper motor 35 to adjust the position of the piston based on the desired flow and the static pressure measurements from ports 23 and 24. Stored in the controller is a table that lists for each desired flow rate the appropriate piston position for each set of pressure measurements. This table is developed empirically. The FIG. 5 device may be used to control air flow into a room. A fast response is not required since it takes a while to change the pressure in the room.

What is claimed is:

1. A device for controlling flow through a conduit, the device comprising:

a venturi meter disposed in the conduit and having a cross-section in the plane that is perpendicular to fluid flow, wherein the area of the cross-section gradually decreases and then gradually increases, the venturi meter's cross-section having a perimeter, the venturi meter also having first and second static pressure ports, the first port being located at a relatively wide portion of the venturi meter, and the second port being located at a narrower portion of the venturi meter, each of the ports including a chamber disposed around the venturi meter's perimeter, such that each of the chambers is in fluid communication with the conduit at a plurality of points around the venuri meter's perimeter:

an adjustable valve for variably impeding flow through the conduit;

means for measuring the static pressure at first and second ports and adjusting the valve based on the static pressure measured at the first and second static pressure ports; and a movably mounted piston having frontal and distal faces, the distal face being exposed to a reference pressure and the frontal face being exposed to the flow in the conduit, the piston being mounted so as to variably restrict flow through the conduit, wherein exerted on the piston are fluid pressures on the piston's frontal and distal faces and a restoring force that tends to lessen the amount the piston restricts flow through the conduit, wherein the reference pressure is a pressure of the fluid opposite the adjustable valve from the piston.

2. A device according to claim 1, wherein the adjustable valve is mounted upstream of and adjacent to the piston.

3. A device for controlling flow through a conduit, the device comprising:

a venturi meter disposed in the conduit and having a cross-section in the plane that is perpendicular to fluid flow, wherein the area of the cross-section gradually decreases and then gradually increases, the venturi meter also having first and second static pressure ports, the first port being located at a relatively wide portion of the venturi meter, and the second port being located at a narrower portion of the venturi meter;

an adjustable valve for variably impeding flow through the conduit;

means for measuring the static pressure at first and second ports and adjusting the valve based on the static pressure measured at the first and second static pressure ports; and a movably mounted piston having frontal and distal faces, the distal face being exposed to a reference pressure an the frontal face being exposed to the flow in the conduit, the piston being so mounted so as to variably restrict flow through the conduit, wherein exerted on the piston are fluid pressures on the piston's frontal and distal faces and a restoring force that tends to lessen the amount the piston restricts flow through the conduit, wherein the adjustable valve is mounted upstream of and adjacent to the piston, and wherein the frontal face of the piston has a central area and a perimeter, and the adjustable valve is a modulator that redirects flow so that fluid flows across the frontal face of the piston away from the central area radially outward towards the piston's perimeter.

4. A device for controlling flow through a conduit, the device comprising:

a venturi meter disposed in the conduit and having a cross-sectional area that decreases and then increases, the venturi meter also having first and second static pressure ports, the first port being located at a relatively wide portion of the venturi meter, and the second port being located at a narrower portion of the venturi meter; an adjustable valve for variably impeding flow through the conduit;

a movably mounted piston mounted downstream from the valve and having frontal and distal faces, the distal face being exposed to a pressure of the flow upstream of the piston and the frontal face being exposed to the flow in the conduit, the piston being so mounted so as to variably restrict flow through the conduit, wherein exerted on the piston are fluid pressures on the piston's frontal and distal faces and a restoring force that tends to lessen the amount the piston restricts flow through the conduit; and means for measuring the static pressure at first and second ports and adjusting the valve based on the static pressure measured at the first and second static pressure ports;

wherein the venturi meter and the valve are disposed in the conduit such that substantially all of the flow that passes through the valve also passes through the venturi meter.

5. A device for controlling flow through a conduit, the device comprising:

a venturi meter disposed in the conduit and having a cross-sectional area that decreases and then increases, the venturi meter also having first and second static pressure ports, the first port being located at a relatively wide portion of the venturi meter, and the second port being located at a narrower portion of the venturi meter;

an adjustable valve for variably impeding flow through the conduit;

a movably mounted piston mounted just downstream from the valve and having frontal and distal faces, the distal face being exposed to a reference pressure and the frontal face being exposed to the flow in the conduit, the piston being so mounted so as to variably restrict flow through the conduit, wherein exerted on the piston are fluid pressures on the piston's frontal and distal faces and a restoring force that tends to lessen the amount the piston restricts flow through the conduit; and means for measuring the static pressure at first and second ports and adjusting the valve based on the static pressure measured at the first and second static pressure ports;

wherein the frontal face of the piston has a central area and a perimeter, and the adjustable valve is a modulator that redirects flow so that fluid flows across the frontal face of the piston away from the central area radially outward towards the piston's perimeter.

6. A device for controlling flow through a conduit, the device comprising:

a piston having a frontal face exposed to the fluid in the path, the frontal face of the piston forming part of a venturi disposed in the conduit such that the conduit has a cross-sectional area that decreases and then increases, the piston being movably mounted so that the piston may move in a direction tranverse to the flow so as to narrow or widen the venturi;

first and second static pressure ports, the first port being located at a relatively wide portion of the conduit, and the second port being located at a narrower portion of the conduit;

position measurement means for determining the position of the piston;

pressure measurement means for measuring the static pressure at first and second ports;

displacement means for adjusting the position of the piston; and control means, in communication with the pressure measurement means, the position measurement means and the displacement means, for controlling the displacement means so as to position the piston based on the static pressure measured at the first and second static pressure ports.

7. A device according to claim 1, wherein the venturi meter and the valve are disposed in the conduit such that substantially all of the flow that passes through the valve also passes through the venturi meter.

8. A device according to claim 7, wherein the venturi meter, the valve and the piston are disposed in the conduit such that substantially all of the flow that the piston is exposed to also passes through the venturi meter and the valve.

9. A device according to claim 8, wherein the adjustable valve is mounted upstream of and adjacent to the piston, and wherein the frontal face of the piston has a central area and a perimeter, and the valve is a modulator that redirects flow so that fluid flows across the frontal face of the piston away from the central area radially outward towards the piston's perimeter.

10. A device according to claim 3, wherein the venturi meter's cross-section has a perimeter, and each of the ports includes a chamber disposed around the venturi's perimeter, such that each of the annular chambers is in fluid communication with the conduit at a plurality of points around the venturi meter's perimeter.

11. A device according to claim 1, wherein the reference pressure is the pressure of an environment, where the fluid is substantially still, and from which the fluid flows into the device.

12. A device according to claim 3, wherein the reference pressure is the pressure of fluid upstream of the adjustable valve.

13. A device according to claim 3, wherein the reference pressure is the pressure of an environment, where the fluid is substantially still, and from which the fluid flows into the device.

14. A device according to claim 4, wherein the reference pressure is the pressure of fluid upstream of the adjustable valve.

15. A device according to claim 4, wherein the reference pressure is the pressure of an environment, where the fluid is substantially still, and from which the fluid flows into the device.

16. A device according to claim 5, wherein the reference pressure is the pressure of fluid upstream of the adjustable valve.

17. A device according to claim 5, wherein the reference pressure is the pressure of an environment, where the fluid is substantially still, and from which the fluid flows into the device.

* * * * *